US012581439B2

(12) United States Patent
Cheng et al.

(10) Patent No.: US 12,581,439 B2
(45) Date of Patent: Mar. 17, 2026

(54) SHORT-RANGE COMMUNICATION METHOD AND APPARATUS

(71) Applicant: Huawei Technologies Co., Ltd., Shenzhen (CN)

(72) Inventors: Xingqing Cheng, Beijing (CN); Lei Gao, Beijing (CN); Lei Wan, Beijing (CN); Changqing Yang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 18/364,206

(22) Filed: Aug. 2, 2023

(65) Prior Publication Data

US 2023/0379851 A1 Nov. 23, 2023

Related U.S. Application Data

(63) Continuation of application No. PCT/CN2021/074952, filed on Feb. 2, 2021.

(51) Int. Cl.
H04W 56/00 (2009.01)

(52) U.S. Cl.
CPC ............................... H04W 56/0015 (2013.01)

(58) Field of Classification Search
CPC ........................... Y02D 30/70; H04W 56/0015
USPC .......................................................... 370/329
See application file for complete search history.

(56) References Cited

U.S. PATENT DOCUMENTS

| | | | |
|---|---|---|---|
| 2009/0228732 A1 | 9/2009 | Budde et al. | |
| 2014/0301183 A1* | 10/2014 | Zheng ................. | H04L 67/1095 |
| | | | 370/219 |
| 2015/0215879 A1 | 7/2015 | Zhu et al. | |
| 2016/0302237 A1* | 10/2016 | Gupta ..................... | H04W 4/70 |
| 2016/0374043 A1* | 12/2016 | Wetterwald ....... | H04W 56/0045 |
| 2019/0007916 A1 | 1/2019 | Petrus et al. | |
| 2020/0336260 A1 | 10/2020 | Liu et al. | |
| 2021/0120085 A1* | 4/2021 | Zhang ................. | H04L 67/1097 |
| 2021/0243711 A1* | 8/2021 | Yeo ......................... | H04W 4/08 |
| 2021/0377889 A1* | 12/2021 | Li ..................... | H04L 27/26025 |
| 2023/0083152 A1* | 3/2023 | Fu ..................... | H04W 56/0015 |
| | | | 370/350 |
| 2023/0188402 A1* | 6/2023 | Qiao ................... | H04L 27/2672 |
| | | | 375/260 |

(Continued)

FOREIGN PATENT DOCUMENTS

| | | |
|---|---|---|
| CN | 101142773 A | 3/2008 |
| CN | 104812056 A | 7/2015 |

(Continued)

*Primary Examiner* — Robert J Lopata
(74) *Attorney, Agent, or Firm* — Conley Rose, P.C.

(57) ABSTRACT

A short-range communication method includes that a first node receives at least one piece of node information from at least one node; and the first node controls the first node to establish time-frequency synchronization with a second node that is in the at least one node and that belongs to a second synchronization area, where node information from the second node includes synchronization information of the second synchronization area, and the synchronization information indicates at least one of a node identifier, a synchronization status, or a synchronization direction between nodes in the second synchronization area.

20 Claims, 6 Drawing Sheets

(56)                    References Cited

U.S. PATENT DOCUMENTS

| | | | | |
|---|---|---|---|---|
| 2023/0300892 A1* | 9/2023 | Xia | .................... | H04L 5/0048 |
| | | | | 370/329 |
| 2023/0308141 A1* | 9/2023 | Wang | ................ | H04W 72/53 |
| 2023/0379876 A1* | 11/2023 | Liu | .................... | H04L 5/0096 |

FOREIGN PATENT DOCUMENTS

| | | | |
|---|---|---|---|
| CN | 109982428 A | 7/2019 |
| CN | 110099021 A | 8/2019 |
| CN | 111107622 A | 5/2020 |
| CN | 111182612 A | 5/2020 |
| CN | 111447673 A | 7/2020 |
| EP | 2835915 B1 | 4/2016 |
| WO | 2014158064 A1 | 10/2014 |

* cited by examiner

SHORT-RANGE COMMUNICATION METHOD AND APPARATUS

CROSS-REFERENCE TO RELATED APPLICATIONS

This application is a continuation application of International Patent Application No. PCT/CN2021/074952, filed on Feb. 2, 2021, the disclosure of which is hereby incorporated by reference in its entirety.

TECHNICAL FIELD

This application relates to the field of communication technologies, and in particular, to a short-range communication method and apparatus, which may be applied to fields such as smart driving, smart household, and smart manufacturing.

BACKGROUND

Current short-range communication systems such as wireless fidelity (Wi-Fi) and Bluetooth (BT) are all asynchronous systems. Nodes interfere with each other, and consequently overall performance and user experience deteriorate. Particularly, this problem is severer in a dense scenario.

For example, for BT, demodulation failure rates in a subway compartment scenario and a subway platform scenario are 56 percent (%) and 80% respectively in a case of four persons per square meter; demodulation failure rates in the subway compartment scenario and the subway platform scenario are 34% and 55% respectively in a case of two persons per square meter; and demodulation failure rates in the subway compartment scenario and the subway platform scenario are 18% and 33% respectively in a case of one person per square meter. It can be learned that in a dense scenario, a demodulation failure rate of BT is very high, affecting user experience. To reduce mutual interference between nodes and improve overall performance, time-frequency synchronization needs to be maintained between different nodes. How to ensure time-frequency synchronization between different nodes is a technical problem to be resolved in embodiments of this application.

SUMMARY

This application provides a short-range communication method and apparatus, to ensure time-frequency synchronization between different nodes.

According to a first aspect, a communication method is provided, including receiving at least one piece of node information from at least one node; and controlling a first node to establish time-frequency synchronization with a second node that is in the at least one node and that belongs to a second synchronization area, where node information from the second node includes synchronization information of the second synchronization area, and the synchronization information indicates at least one of a node identifier, a quantity of nodes, a synchronization status, or a synchronization direction between nodes in the second synchronization area. Optionally, the at least one node may send the node information in a broadcast manner, or may send the node information in a unicast manner. This is not limited. Optionally, the method further includes determining, from the at least one node, the second node used as a synchronization source.

According to the foregoing method, the first node may select the second node from the at least one node around the first node by using the node information sent by the at least one node, and the first node establishes time-frequency synchronization with the second node, to ensure time-frequency synchronization between different nodes, reduce interference between different nodes, and improve system communication performance.

In a possible implementation, the second synchronization area is a synchronization area with a largest quantity of nodes (for example, primary nodes) in a synchronization area to which the at least one node belongs. In other words, the quantity of nodes in the second synchronization area is greater than or equal to a quantity of nodes in any synchronization area other than the second synchronization area in at least one synchronization area to which the at least one node belongs.

In a possible implementation, the method further includes sending first updated synchronization information of the second synchronization area, where the first updated synchronization information is obtained by updating the synchronization information of the second synchronization area based on establishment of the time-frequency synchronization. Optionally, the first updated synchronization information of the second synchronization area may be sent by using broadcast information.

According to the foregoing method, the first node joins the second synchronization area by establishing time-frequency synchronization with the second node. For example, after the first node joins the second synchronization area, the first node may update the synchronization information of the second synchronization area, to obtain the first updated synchronization information. The first node sends the first updated synchronization information to the outside, to notify another node around the first node. After receiving the first updated synchronization information of the second synchronization area, the another surrounding node mainly performs the following two operations to determine whether the another surrounding node has joined the second synchronization area currently. In a first operation, if the another surrounding node has joined the second synchronization area currently, the another surrounding node updates, based on the first updated synchronization information of the second synchronization area, synchronization information that is of the second synchronization area and that is stored in the another surrounding node. In a second operation, if the another surrounding node has not joined the second synchronization area currently, whether to join the second synchronization area is comprehensively determined based on the first updated synchronization information of the second synchronization area. Through iteration of the foregoing method, more nodes can join a specific synchronization area, so that time-frequency synchronization in an entire network is established.

In a possible implementation, the method further includes determining, from the at least one node based on the at least one piece of node information of the at least one node and/or signal strength of the at least one node, the second node that belongs to the second synchronization area.

Optionally, the at least one piece of node information from the at least one node includes synchronization information of a synchronization area to which the node belongs and/or priority information of the node, and the synchronization information indicates at least one of a node identifier, a quantity of nodes, a synchronization status, or a synchronization direction between nodes in the synchronization area.

According to the foregoing method, the first node may select, from the at least one node based on information included in the node information of the at least one node, the signal strength of the at least one node, and/or the like, the second node for establishing time-frequency synchronization. Optionally, the node information of the at least one node includes the synchronization information of the synchronization area to which the node belongs, a priority of the node, and/or the like. For example, the first node may determine, based on the synchronization information of the synchronization area to which the at least one node belongs, a quantity of nodes included in a synchronization area to which each of the at least one node belongs; and select a synchronization area with a largest quantity of nodes. The first node chooses to join the synchronization area with the largest quantity of nodes. In the foregoing manner, more nodes can join a same synchronization area, so that time-frequency synchronization between nodes in an entire network is implemented, and mutual interference between different nodes is reduced.

In a possible implementation, before the first node is controlled to establish time-frequency synchronization with the second node that is in the at least one node and that belongs to the second synchronization area, the first node belongs to a first synchronization area; and the quantity of nodes in the second synchronization area is greater than or equal to a quantity of nodes in the first synchronization area.

Alternatively, before the first node is controlled to establish time-frequency synchronization with the second node that is in the at least one node and that belongs to the second synchronization area, the first node belongs to a first synchronization area; and the quantity of nodes in the second synchronization area is equal to a quantity of nodes in the first synchronization area, and a priority and/or signal strength of the second node are/is higher than a priority and/or signal strength of a node with which the first node establishes time-frequency synchronization.

According to the foregoing method, because time-frequency synchronization may be performed a plurality of times in an entire network, in one time-frequency synchronization process, each node in the entire network sends node information to the outside. The node information of each node includes synchronization information of a synchronization area that the node joins. In each time-frequency synchronization process, a node always chooses to join a synchronization area with a large quantity of nodes, so that time-frequency synchronization in the entire network is established. If a quantity of nodes included in a synchronization area that the first node currently joins is greater than a quantity of nodes included in a synchronization area that a node around the first node joins, the first node does not need to join a synchronization area of another node. For example, only when the quantity of nodes in the first synchronization area that the first node joins is less than the quantity of nodes in the synchronization area that a node around the first node joins, for example, the quantity of nodes in the second synchronization area, does the first node join the second synchronization area. Alternatively, there is a possibility that a quantity of nodes included in the first synchronization area that the first node joins is equal to a quantity of nodes included in the second synchronization area that the second node joins. However, in this case, it may need to be ensured that the priority and/or the signal strength of the second node are/is higher than a priority and/or signal strength of the first node, so that the first node may choose to join.

In a possible implementation, before the first node is controlled to establish time-frequency synchronization with the second node that is in the at least one node and that belongs to the second synchronization area, the first node does not belong to any synchronization area. The quantity of nodes in the second synchronization area is greater than a quantity of nodes in any synchronization area other than the second synchronization area in at least one synchronization area to which the at least one node belongs.

Further, if at least two synchronization areas exist in the at least one synchronization area to which the at least one node belongs, quantities of nodes in the at least two synchronization areas are the same and are greater than a quantity of nodes in any synchronization area other than the at least two synchronization areas in the at least one synchronization area, the second node belongs to the at least two synchronization areas, and a priority and/or signal strength of the second node are/is higher than a priority and/or signal strength of any node other than the second node in nodes corresponding to the at least two synchronization areas.

According to the foregoing method, if the first node has not joined any synchronization area currently, a common operation is that the first node selects, based on node information sent by at least one surrounding node, a synchronization area that includes a largest quantity of nodes from synchronization areas, and chooses to join. However, in a scenario, there may be at least two synchronization areas including a largest quantity of nodes. In this case, the first node may select a synchronization area from the plurality of synchronization areas with the largest quantity of nodes according to another rule, for example, a priority or signal strength. In the foregoing manner, the first node can uniquely determine and join a synchronization area, and it may be ensured to some extent that performance in the synchronization area is higher than that in another synchronization area. For example, if a plurality of synchronization areas includes a same quantity of nodes, a priority and/or signal strength may be further considered, to improve performance of time-frequency synchronization in an entire network.

In a possible implementation, the at least one node includes at least one third node other than the second node, and the at least one third node belongs to the second synchronization area; and the second node is determined from the second node and the at least one third node according to a preset rule.

In a possible implementation, the preset rule includes at least one of the following such as a priority of a node or signal strength of a node.

According to the foregoing method, the first node selects, from the at least one node, a node that meets a condition. If a plurality of nodes that meet the condition are selected, such as the second node and the third node, the first node may further select a node from the plurality of nodes according to the preset rule, to establish time-frequency synchronization. For example, the preset rule may include that a priority of a node is relatively high, and/or signal strength is relatively high, so that the second node with which the first node establishes time-frequency synchronization is relatively good, thereby improving performance of time-frequency synchronization in an entire network.

In a possible implementation, before the first node is controlled to establish time-frequency synchronization with the second node that is in the at least one node and that belongs to the second synchronization area, a priority of the first node is higher than that of the second node; and that the first node controls the first node to establish time-frequency synchronization with the second node that is in the at least one node and that belongs to the second synchronization area further includes that the first node decreases the priority of the first node and/or increases the priority of the second node, so that the priority of the second node is higher than or equal to that of the first node.

According to the foregoing method, if a rule is preset, the first node establishes time-frequency synchronization with only a node with a high priority. It is assumed that the second node is selected from the at least one node based on a condition such as a quantity of nodes included in a synchronization area. However, the priority of the second node is lower than that of the first node. In this case, the first node may decrease the priority of the first node, or increase the priority of the second node, so that the priority of the second node is higher than that of the first node. Subsequently, the first node may establish time-frequency synchronization with the second node and join the second synchronization area. This helps implement time-frequency synchronization in an entire network.

In a possible implementation, the method further includes that the first node determines, within a preset time period, that node information of the second node is not received; and the first node sends second updated synchronization information of the second synchronization area, where the second updated synchronization information is obtained by updating the first updated synchronization information based on the determining that node information of the second node is not received.

According to the foregoing method, the first node establishes time-frequency synchronization with the second node and joins the second synchronization area.

If the first node does not receive broadcast information, for example, a synchronization signal, of the second node within a preset time period, the first node may determine that the second node is faulty or is moved out of a network, and the first node may update synchronization information of a synchronization area that the first node currently joins, for example, update the second synchronization information of the second synchronization area. For example, the second synchronization area includes a node A, a node B, and a node C. A parent node of the node A is the node B, and a parent node of the node B is the node C. When the node C is moved out of the network, or is faulty, or the like, the node B may update node identifiers included in the synchronization information of the second synchronization area to node A and node B. Finally, the first node may send node information including the second updated synchronization information, to notify a node around the first node, so as to re-establish time-frequency synchronization in the entire network. According to the foregoing method, when a node is faulty or is moved out of a network, a node in the network may still restore time-frequency synchronization in the entire network through continuous update.

In a possible implementation, the node identifier is a media access control (MAC) address of a node, an identifier that is generated based on a MAC address of a node and that identifies a node identity, another identifier for identifying a node identity, or an identifier of a communication domain in which the node is located.

According to a second aspect, a communication method is provided, including a second node sends node information of the second node, where the node information includes first synchronization information of a second synchronization area to which the second node belongs; and the second node receives node information from a first node, where the node information includes second synchronization information of the second synchronization area, the second synchronization information is updated synchronization information based on establishment of time-frequency synchronization, and the second synchronization information is different from the first synchronization information. Optionally, the second node may further update the first synchronization information to the second synchronization information, where the synchronization information indicates at least one of a node identifier, a quantity of nodes, a synchronization status, or a synchronization direction between nodes in the second synchronization area.

In a possible implementation, the method further includes that the second node sends the second synchronization information of the second synchronization area and/or priority information of the second node.

According to the foregoing method, after the second node joins the second synchronization area, the second node may send the first synchronization information of the second synchronization area to the outside, to notify a node around the second node. If the node around the second node includes the first node, after the first node joins the second synchronization area by establishing time-frequency synchronization with the second node, the first node may update the first synchronization information of the second synchronization area to the second synchronization information, and the first node sends the second synchronization information to the outside. The second node may update the first synchronization information of the second synchronization area to the second synchronization information based on the second synchronization information. Optionally, the second node may send the second synchronization information of the second synchronization area to the outside, to notify the node around the second node. Through the foregoing iteration process, more nodes join the second synchronization area, and a quantity of nodes included in the synchronization information of the second synchronization area is also increasing, thereby implementing time-frequency synchronization in an entire network.

In a possible implementation, the node information of the first node includes priority information of the first node, and/or the node information of the second node includes the priority information of the second node.

In a possible implementation, the node identifier is a MAC address of a node, an identifier that is generated based on a MAC address of a node and that identifies a node identity, another identifier for identifying a node identity, or an identifier of a communication domain in which the node is located.

According to a third aspect, a communication apparatus is provided. The apparatus is configured to implement the first aspect or any method in the first aspect, and includes corresponding function modules or units, which are separately configured to implement the steps in the method in the first aspect. A function may be implemented by hardware, or may be implemented by hardware by executing corresponding software. The hardware or software includes one or more modules or units corresponding to the function.

According to a fourth aspect, a communication apparatus is provided. The apparatus is configured to implement the second aspect or any method in the second aspect, and includes corresponding function modules or units, which are separately configured to implement the steps in the method in the second aspect. A function may be implemented by hardware, or may be implemented by hardware by executing corresponding software. The hardware or software includes one or more modules or units corresponding to the function.

According to a fifth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the first aspect or any method in the first aspect.

According to a sixth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the second aspect or any method in the second aspect.

According to a seventh aspect, a terminal is provided. The terminal may include the apparatus according to the third aspect or the fifth aspect, and the apparatus according to the fourth aspect or the sixth aspect. Optionally, the apparatus may be a smart household device, a smart manufacturing device, a smart transportation device, or the like, for example, a vehicle, an uncrewed/unmanned aerial vehicle, an uncrewed transport vehicle, an automobile, or a robot.

According to an eighth aspect, a computer-readable storage medium is provided. The computer-readable storage medium stores a computer program or instructions. When the computer program or the instructions is/are executed by an apparatus, the apparatus is enabled to perform the method in any one of the first aspect or the possible implementations of the first aspect.

According to a ninth aspect, a computer-readable storage medium is provided. The computer-readable storage medium stores a computer program or instructions. When the computer program or the instructions is/are executed by an apparatus, the apparatus is enabled to perform the method in any one of the second aspect or the possible implementations of the second aspect.

According to a tenth aspect, this application provides a computer program product. The computer program product includes a computer program or instructions. When the computer program or the instructions is/are executed by an apparatus, the apparatus is enabled to perform the method in any one of the first aspect or the possible implementations of the first aspect.

According to an eleventh aspect, this application provides a computer program product. The computer program product includes a computer program or instructions. When the computer program or the instructions is/are executed by an apparatus, the apparatus is enabled to perform the method in any one of the second aspect or the possible implementations of the second aspect.

DESCRIPTION OF EMBODIMENTS

For ease of understanding, concepts related to this application are described for reference by using examples, as shown below.

1. Time-Frequency Synchronization

Figure 3A:
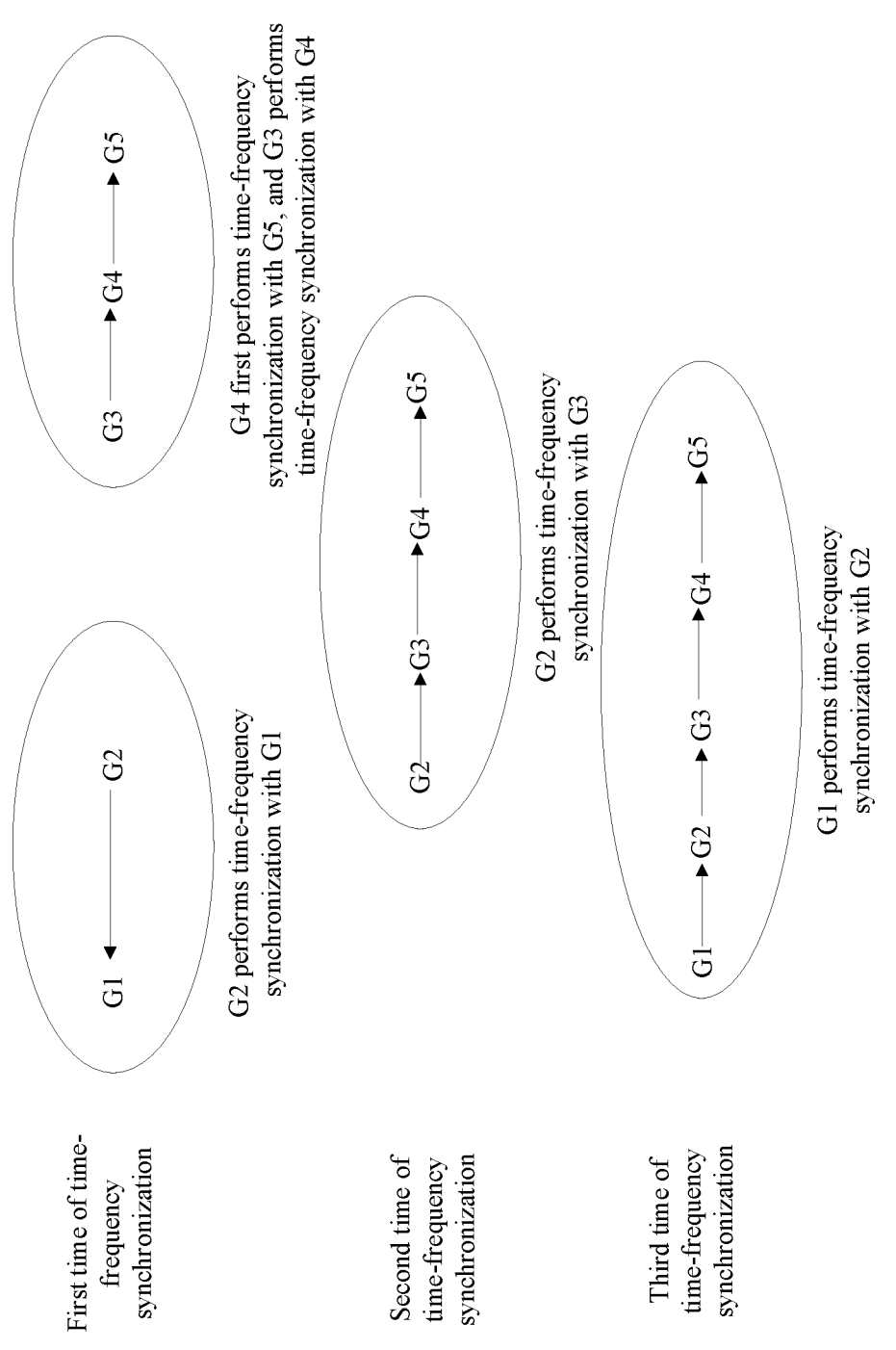
FIG. 3A is a schematic diagram of time-frequency synchronization of a grant node according to an embodiment of this application.
Figure 3B:
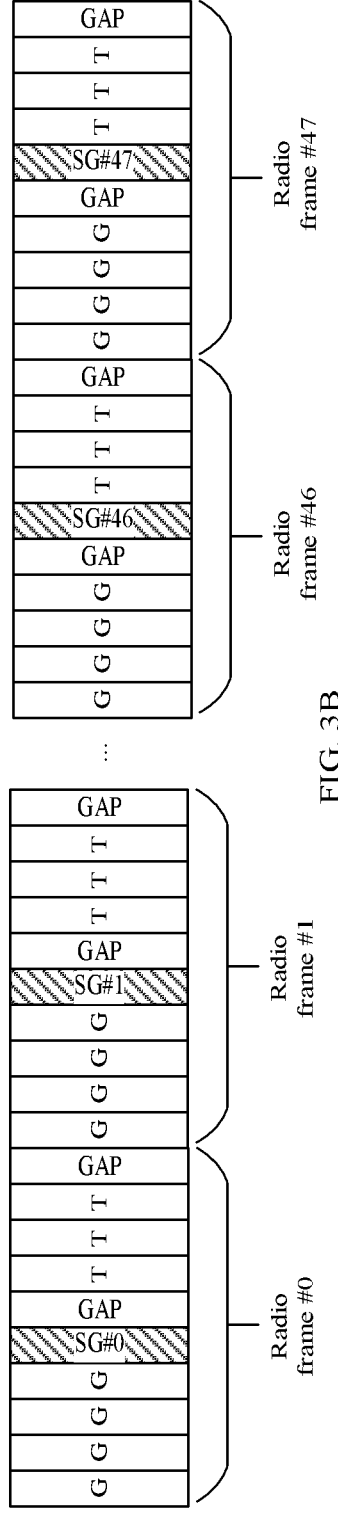
FIG. 3B is a schematic diagram of a super frame according to an embodiment of this application.

Time-frequency synchronization includes time synchronization and frequency synchronization. Time synchronization refers to adjusting clock values of different nodes to specific accuracy or a specific compliance degree, or adjusting errors of transmission start moments of time units of different nodes to a specific range. A unit of the time unit may be a super frame, a radio frame, a symbol, another time unit, or the like. The super frame is a time unit including a plurality of radio frames, the radio frame is a time unit smaller than the super frame, and the symbol is a time unit smaller than the radio frame. For example, in an automotive wireless short-range communication system, it is specified that a length of a radio frame is $\frac{1}{48}$ milliseconds (ms) $=20.833$ microseconds ($\mu$s), each super frame includes 48 radio frames, and a length of each super frame is 1 ms. In an example, as shown in FIG. 3B, one super frame includes 48 radio frames, and numbers of the 48 radio frames are sequentially radio frame #0 to radio frame #47. Each radio frame includes 10 symbols. In the 10 symbols, four symbols are used for downlink, three symbols are used for uplink, two symbols are used as a guard gap (GAP), and one symbol is used as a flexible symbol. The flexible symbol may be used for uplink transmission, or may be used for downlink transmission, or may be used for other transmission. This is not limited. In an in-vehicle (or non-in-vehicle) wireless short-range communication system, uplink usually refers to a direction in which a terminal (T) node sends data or information to a grant (G) node, and may be represented by "T". Downlink usually refers to a direction in which a G node sends data or information to a T node, and may be represented by "G". In the automotive wireless short-range communication system, there is usually a requirement for communication between different T nodes or different G nodes, and communication between different T nodes or different G nodes may occupy the foregoing flexible symbol. In FIG. 3B, the flexible symbol is represented as a special grant (SG). The foregoing explanations of the frame and the super frame may be applied to the following embodiments.

Frequency synchronization refers to keeping a carrier frequency error between different nodes within a specific range. The carrier frequency error between different nodes may be a relative/absolute error between an actual frequency and an expected frequency of a node, or a relative/absolute error between actual frequencies of different nodes, or the like. Frequency synchronization may also be referred to as frequency orthogonalization. For example, a subcarrier frequency used by node 1 is f0, and a subcarrier frequency used by node 2 is f1. If a difference between f1 and f0 is an integer multiple of a subcarrier spacing or is close to an integer multiple of a subcarrier spacing, but the difference between f1 and f0 meets a specific constraint condition, where the constraint condition may be determined based on factors such as a system anti-interference capability and a service feature, it is considered that the frequencies used by node 1 and node 2 are kept orthogonal; or if a difference between f1 and f0 is not an integer multiple of a subcarrier spacing or is not close to an integer multiple of a subcarrier spacing, or the difference between f1 and f0 does not meet a specific constraint condition, it is considered that the frequencies used by node 1 and node 2 are not orthogonal.

For example, in an implementation, if a T node needs to establish time synchronization with an associated G node, the T node needs to obtain a start location and an end location of a symbol sent by the G node. If duration of the symbol understood by the T node is consistent with that understood by the G node, and the T node establishes time synchronization with the G node. The T node needs to obtain a carrier frequency of the G node, so that an error between a carrier frequency of the T node and the carrier frequency of the G node is kept within a specific range, and the T node establishes frequency synchronization with the G node. For example, the carrier frequency error between the T node and the G node may be 100 Hertz (Hz).

2. Broadcast Information

Broadcast is an information propagation manner, and is a manner in which a node in a network sends information. A range in which the information can be propagated is referred to as a broadcast domain, and another node in the broadcast domain can receive the information. Information sent in a broadcast manner may be referred to as broadcast information, including but not limited to a broadcast channel and/or system information. In contrast, unicast information is information communicated between a single sender and a single receiver through a network. For example, a synchronization signal and a system message are broadcast information.

The broadcast domain may be affected by a plurality of factors. For example, a higher transmit power of a node indicates a larger broadcast domain. Alternatively, compared with a high band, a low band indicates a longer propagation distance, and a larger broadcast domain. For ease of description, in the following embodiments, that a distance between two nodes is relatively short or one node is located near another node means that one node is located in a broadcast domain of another node, for example, the node can receive broadcast information sent by the another node. In this application, broadcast information is used as an example for description, but an information sending manner is not limited to broadcast.

3. Synchronization Area

The synchronization area may include at least one primary node, and all primary nodes in the synchronization area keep time-frequency synchronization. The primary node herein may be a G node in this application, for example, a management node in a wireless short-range communication system. The primary node may send synchronization information, so that another primary node outside the synchronization area establishes time-frequency synchronization with the primary node and joins the synchronization area. It should be noted that, in a wireless short-range communication system, there may be another G node that cannot send synchronization information to provide a time-frequency synchronization function. The G node does not belong to a range of primary nodes in a synchronization area. Although the terminal node T node described above can establish time-frequency synchronization with the G node, the terminal node does not belong to the range of primary nodes in the synchronization area. In other words, the primary node included in the synchronization area in this application is only a G node that can send synchronization information to provide a time-frequency synchronization function in the synchronization area, and neither of another G node and a T node is used to describe the core solution. For brevity, the primary node in the synchronization area is directly referred to as "node" below. However, a person skilled in the art may understand that, if permitted, another G node and a T node may establish time-frequency synchronization by using the primary node.

It should be noted that, in the descriptions of this application, a synchronization area to which a node belongs may also be referred to as a synchronization area associated with the node, a synchronization area that the node joins, or the like. A synchronization area that each node joins may dynamically change. For example, a node currently joins a synchronization area A. If, through observation, the node finds that a synchronization area B is more suitable for the node, the node may establish time-frequency synchronization with a node in the synchronization area B, to join the synchronization area B.

4. Synchronization Information

In this application, node information sent by a node may include synchronization information of a synchronization area to which the node belongs, and the synchronization information may indicate at least one of a node identifier, a quantity of nodes, a synchronization status, a synchronization direction between nodes, or the like in the synchronization area. It should be noted herein that the node identifier in the synchronization area may be identifiers of all G nodes in the synchronization area, or may be identifiers of all primary nodes (referring to the explanation in 3. Synchronization area) in the synchronization area, or may be identifiers of all primary nodes or G nodes on a synchronization path from a root node to a current node in the synchronization area. The quantity of nodes in the synchronization area may be a quantity of all G nodes in the synchronization area, or may be a quantity of all primary nodes (referring to the explanation in 3. Synchronization area) in the synchronization area. In other words, neither of the node identifier and the quantity of nodes herein is related to a T node. The root node is the first node in the synchronization area, and another node in the synchronization area directly or indirectly joins the synchronization area through the root node. The synchronization path is a connection path from the root node to the current node. For example, if the current node joins the synchronization area by using a parent node, and the parent node joins the synchronization area by using the root node, the current node, the parent node, and the root node form the synchronization path.

Each piece of information indicated by the synchronization information may be directly indicated by using the synchronization information, or may be implicitly indicated by using the synchronization information. For example, the synchronization information may include the quantity of nodes in the synchronization area, and the quantity of nodes is directly indicated. Alternatively, the synchronization information does not include the quantity of nodes in the synchronization area, and the quantity of nodes may be implicitly indicated by using other information in the synchronization information, for example, the node identifier. For example, if the synchronization information of the synchronization area includes identifiers of three nodes such as A, B, and C, the identifiers of the three nodes may implicitly indicate that the quantity of nodes included in the synchronization area is 3.

For example, it is assumed that the synchronization area includes five primary nodes, which are respectively G1, G2, G3, G4, and G5. The synchronization information of the synchronization area includes a node identifier, a synchronization status, and a synchronization direction. As shown in Table 1, the node identifier may refer to identifiers of G1 to G5 in Table 1. The synchronization status may refer to a synchronization status of each node, and may be represented by a binary value "0" or "1". For example, a synchronization status of the node G1 may be that the node G1 separately keeps time-frequency synchronization with the node G1 and the node G2, and the node G1 does not keep time-frequency synchronization with each of the node G3, the node G4, and the node G5. The synchronization direction may be a synchronization direction of each node. For example, "1" indicates that Gx performs time-frequency synchronization with Gy. For example, if G1→G2 is "1", it indicates that G1 performs time-frequency synchronization with G2, for example, a time and a frequency of G1 are adjusted according to a time and a frequency of G2, G2 is a parent node in time-frequency synchronization, and G1 is a child node in time-frequency synchronization. "0" indicates that Gx does not perform time-frequency synchronization with Gy. For example, if G2→G1 is "0", it indicates that G2 does not perform time-frequency synchronization with G1, for example, a time and a frequency of G2 are not adjusted according to a time and a frequency of G1.

It should be noted that time-frequency synchronization in Table 1 is directional. For example, if G1 performs time-frequency synchronization with G2, for example, a time and a frequency of G1 are adjusted according to a time and a frequency of G2, a value of G1→G2 is "1". However, on the contrary, if G2 does not perform time-frequency synchronization with G1, for example, the time and the frequency of G2 are not adjusted according to the time and the frequency of G1, a value of G2→G1 is "0". Herein, it should be noted that the table is merely a representation form of a relationship. In specific implementation, a manner in which only a table is used is not limited. Any other manner in which corresponding information can be reflected may be used in implementations of this application.

TABLE 1

|  | G1 | G2 | G3 | G4 | G5 |
|---|---|---|---|---|---|
| G1 | 1 | 1 | 0 | 0 | 0 |
| G2 | 0 | 1 | 1 | 0 | 0 |
| G3 | 0 | 0 | 1 | 1 | 0 |
| G4 | 0 | 0 | 0 | 1 | 1 |
| G5 | 0 | 0 | 0 | 0 | 1 |

5. Node Identifier

The node identifier may be a MAC address of a node, or a part of a MAC address of a node, for example, first n bits, last n bits, or n middle bits in the MAC address of the node, or any n bits in the MAC address of the node, where the n bits may be consecutive values or non-consecutive values in the MAC address. This is not limited. A value of n is a positive integer greater than or equal to 1 and less than a quantity of all bits of the MAC address. Alternatively, the node identifier may be an identifier that is generated based on a MAC address of a node and that is used to identify a node identity. For example, a logical operation is performed by using the MAC address of the node and a preset character, and an operation result is used as the node identifier. The logical operation may include logical exclusive OR, logical addition and subtraction, or the like. Alternatively, the node identifier may be another identifier or an address that can identify a node identity, for example, an index or an address pre-allocated to the node.

In a possible design of the node identifier, the node identifier may be an identifier of a communication domain in which the node is located. In an example, on a carrier used by a G node, a resource set including a resource for sending a synchronization signal, broadcast information, and G link control information by the G node and a resource that can be scheduled and configured by the G node is referred to as a communication domain of the G node or a communication domain resource of the G node, and the G node is referred to as a G node of the communication domain. One communication domain usually includes one G node and at least one T node. In this case, an identifier of the communication domain may be equivalent to an identifier of the G node, or in other words, an identifier of the G node may be referred to as an identifier of the communication domain in which the G node is located. Therefore, for a primary node in a synchronization area, a node identifier of the primary node may also be understood as an identifier (DomainID) of a communication domain in which the primary node is located.

It should be noted that, to clearly describe the technical solutions in embodiments of this application, words such as "first" and "second" are used in the descriptions of embodiments of this application to distinguish between same items or similar items that have basically the same functions. A person skilled in the art may understand that the words such as "first" and "second" do not limit a quantity or an execution order, and the words such as "first" and "second" do not necessarily indicate a specific difference. In addition, in the descriptions of this application, unless otherwise specified, "at least one" means one or more, and "a plurality of" means two or more. "At least one of the following items (pieces)" or a similar expression thereof refers to any combination of these items, including a single item (piece) or any combination of a plurality of items (pieces). For example, at least one of a, b, or c may represent a, b, c, a and b, a and c, b and c, or a, b, and c, where a, b, and c may be singular or plural.

The following describes the technical solutions of this application with reference to the accompanying drawings.

Figure 1:
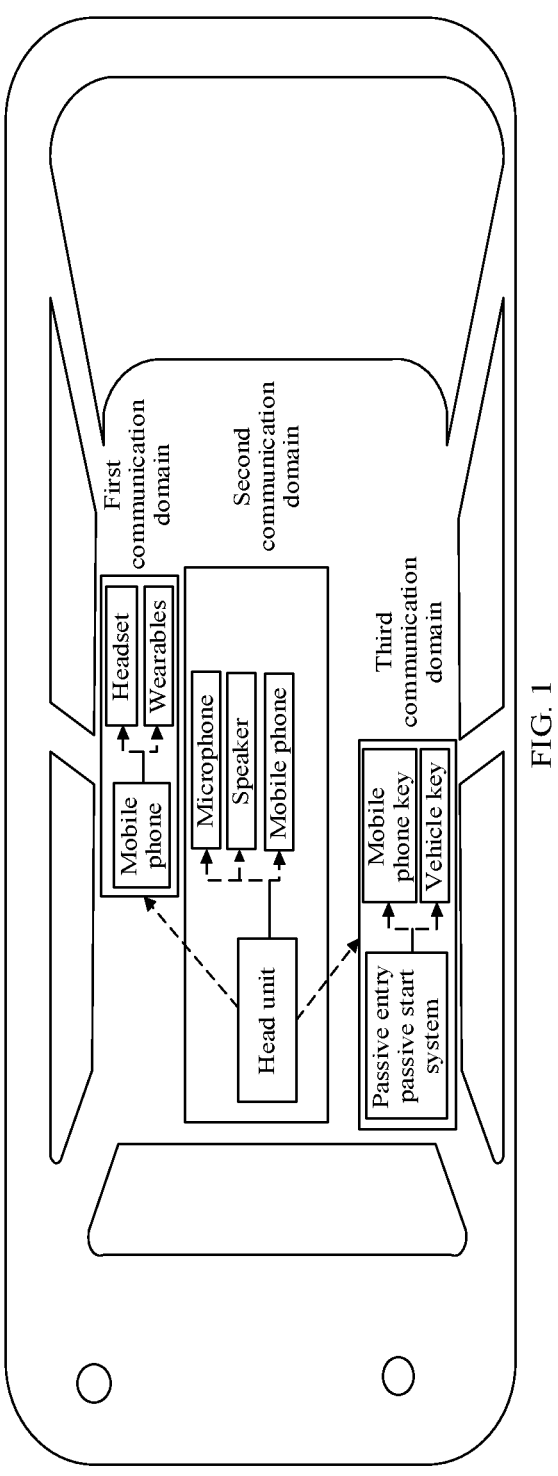
FIG. 1 is a schematic diagram of an application scenario according to an embodiment of this application.

FIG. 1 shows a possible application scenario of the solutions of this application. In a wireless communication scenario in which a smart terminal is located, there are usually a plurality of communication domains in a specific communication area or range. FIG. 1 is a schematic diagram of a topology relationship of an in-vehicle communication link. A group of communication nodes such as one G node and at least one T node, that have a communication relationship work in the communication domain. The G node manages a time-frequency resource of the communication domain, and has a function of scheduling a resource for a communication link between T nodes. A node that does not belong to the communication domain may be referred to as an external node (including a node that has not joined the communication domain and a node that joined the communication domain but exited the communication domain). An external node may be converted into a T node in the communication domain by using a process of joining the communication domain. In the process of joining the communication domain, the external node first needs to perform time-frequency synchronization with the communication domain, and obtain system information such as a resource configuration and a supported feature of the communication domain. In each communication domain, a T node may keep time-frequency synchronization with a G node corresponding to the T node. A manner of synchronizing the T node with the G node is not limited in this application. When there is a plurality of communication domains in an area or a scenario, how to ensure that G nodes in the plurality of communication domains keep time-frequency synchronization to reduce interference between different communication domains and improve a system communication capability is a technical problem to be resolved in embodiments of this application.

In some embodiments, as shown in FIG. 1, there are three communication domains in a particular area (for example, a cockpit of a smart vehicle) such as a first communication domain, a second communication domain, and a third communication domain. In the first communication domain, a mobile phone is used as a G node, and a headset and a wearable device are used as T nodes. In the second communication domain, a head unit is used as a G node, and a microphone, a speaker, a mobile phone, and the like are used as T nodes. In the third communication domain, a passive entry passive start system is used as a G node, and a mobile phone key and a vehicle key are used as T nodes. In this example, time-frequency synchronization needs to be kept between three G nodes such as the mobile phone, the head unit, and the passive entry passive start system.

In another application scenario of this application, a short-range wireless system includes at least one G node, and at least one T node accesses each G node. The G node may be considered as a creator of a wireless network, and is an intermediate node of the network. A function of the G node is similar to that of a base station or a Wi-Fi access point (AP). The T node may be considered as a terminal connected to a wireless network, for example, a mobile phone, a headset, a notebook computer, or a computer. In some embodiments, a mobile phone may be used as a G node, and a headset that belongs to a same user as the mobile phone may be used as a T node. In some other embodiments, a plurality of G nodes may be arranged in a conference room, and another terminal device in the conference room may serve as a T node, for example, a wireless speaker and a mobile phone, which accesses any one of the plurality of G nodes. Alternatively, in some other embodiments, a smart vehicle includes a plurality of G nodes. For an example of the G node in the smart vehicle, refer to FIG. 1. Subsequently, if a terminal device (for example, a mobile phone) used as a G node moves into an area of the smart vehicle, the terminal device needs to keep time-frequency synchronization with the plurality of original G nodes in the smart vehicle. How to keep time-frequency synchronization between a plurality of G nodes in a specific area is a technical problem to be resolved in embodiments of this application. Alternatively, the solutions in embodiments of this application are also applicable to keeping time-frequency synchronization between a plurality of G nodes in a specific area, but do not limit that the plurality of G nodes definitely belong to a same device.

It should be noted that the foregoing application scenario is merely an example for description, and is not intended to limit embodiments of this application. A person of ordinary skill in the art may learn that the technical solutions provided in embodiments of this application are also applicable to a similar technical problem as a network evolves and a new service scenario emerges.

At present, there are mainly the following two solutions for implementing time-frequency synchronization between different nodes.

In a first solution, all nodes are kept consistent with a common synchronization source, for example, a global navigation satellite system (GNSS). A main problem is that, in a place in which the GNSS cannot be connected or performance of connecting to the GNSS is poor, such as an indoor place, a vehicle, or a basement, a node cannot keep relatively good synchronization with the GNSS, resulting in asynchronization between nodes.

In a second solution, a node keeps synchronization with a specific node, for example, keeps synchronization with a node with a strongest signal. A main problem is that synchronization of all nodes cannot be ensured in a case of dense deployment. For example, there are five nodes such as A, B, C, D, and E. A nearby node that is found by the node B and that has a strongest signal is the node A, and the node B performs synchronization with the node A. A nearby node that is found by the node C and that has a strongest signal is the node D, the node C performs synchronization with the node D, and the node D performs synchronization with the node E. In this case, the node B and the node C do not keep synchronization, and the node B and the node C interfere with each other. Consequently, synchronization in an entire network cannot be achieved.

Based on the foregoing description, this application provides a communication method. The method includes at least receiving node information from at least one node; and controlling a first node to establish time-frequency synchronization with a second node that is in the at least one node and that belongs to a second synchronization area, where node information from the second node includes synchronization information of the second synchronization area. According to the method in embodiments of this application, time-frequency synchronization between different nodes can be ensured, interference between different nodes can be reduced, and system communication performance can be improved.

Figure 2:
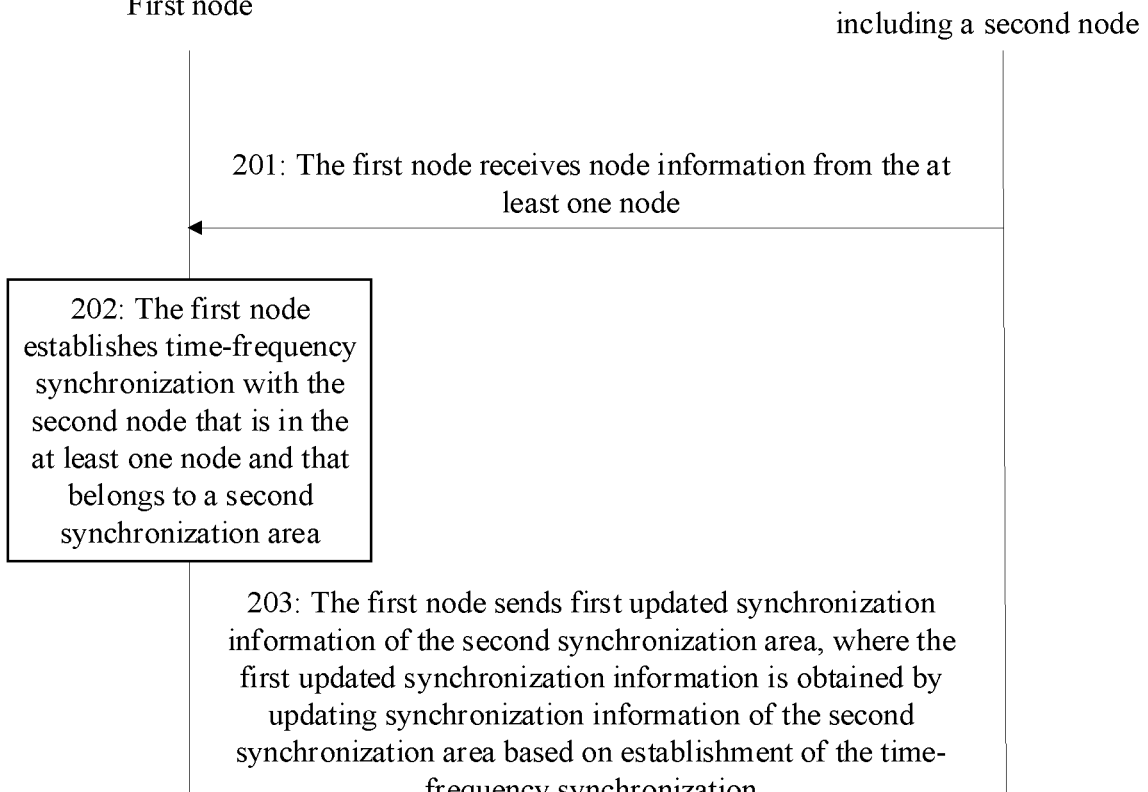
FIG. 2 is a flowchart of a communication method according to an embodiment of this application.

In the following embodiment, an example in which a first node in a network establishes time-frequency synchronization is used for description. In addition, a node with which the first node establishes time-frequency synchronization is referred to as a second node, and a synchronization area to which the second node belongs is referred to as a second synchronization area. It may be understood that the first node and the second node may be primary nodes (referred to as nodes for short below according to the foregoing explanation) in a wireless short-range communication system. As shown in FIG. 2, a procedure of a communication method is provided, including at least the following steps.

Step 201: A first node receives node information from at least one node. For example, the node information may be broadcast information or unicast information (which may also be understood as point-to-point information).

In a design, the node information may be sent in a broadcast manner. For example, the node information may be sent in a first cycle. For another example, the node information may be carried in a system message.

In another design, the first node sends request information to the at least one node, and after receiving the request information, the at least one node sends the node information. In this design, the node information is sent in a unicast manner.

The following describes the solutions by using broadcast information as an example. A person skilled in the art may know that the broadcast information may be replaced with unicast information.

Step 202: The first node establishes time-frequency synchronization with a second node that is in the at least one node and that belongs to a second synchronization area. This may also be understood as that the second node is a synchronization source of the first node. A synchronization source is a source node with which a current node establishes time-frequency synchronization to join a corresponding synchronization area.

In an optional design, the second synchronization area is a synchronization area with a largest quantity of nodes (for example, primary nodes) in a synchronization area to which the at least one node belongs. In other words, the quantity of nodes in the second synchronization area is greater than or equal to a quantity of nodes in any synchronization area other than the second synchronization area in at least one synchronization area to which the at least one node belongs.

In this embodiment of this application, there is at least one node near the first node, and the at least one node may send corresponding node information. For example, the at least one node may send broadcast information periodically or based on a condition such as event triggering, or send the node information in a unicast manner. The first node may determine, from the at least one node based on the at least one piece of node information of the at least one node and/or signal strength of the at least one node, the second node that belongs to the second synchronization area. Optionally, the node information of the at least one node includes synchronization information of the synchronization area to which the node belongs, a priority of the node, and/or the like. A process in which the first node selects the second node from the at least one node may be discussed in the following several cases.

1. The First Node Preferentially Considers a Priority.

In this embodiment of this application, priorities of different nodes may be preset.

In an example, a priority may be directly configured for each node. Alternatively, a priority may be indirectly configured for each node. For example, to facilitate synchronization between different nodes, a synchronization sequence is usually configured for each G node, and the synchronization sequence is used to perform time-frequency synchronization between different nodes. In this embodiment of this application, each node may determine a priority of the node by using a synchronization sequence configured for the node. For example, a correspondence between a synchronization sequence and a priority may be preset. After obtaining a synchronization sequence configured for a terminal device, the terminal device may determine a priority of the node based on the synchronization sequence. For example, if a synchronization sequence pre-configured for a node G1 is a synchronization sequence A, and a priority corresponding to the synchronization sequence A is A, a priority of the node G1 may be A.

In another example, the priority may be indicated by a node sequence, a node location, or a distance between a current node and a root node on a synchronization path in the synchronization area. According to the foregoing description, the synchronization path is a connection path from the root node to the current node. For example, if the current node joins the synchronization area by using a parent node, and the parent node joins the synchronization area by using the root node, the current node, the parent node, and the root node form the synchronization path. In this example, a priority of the root node may be identified as 0. In the synchronization area and the synchronization path, the priority of the root node is the highest. Therefore, a priority of the parent node is 1 (for example, a distance between the parent node and the root node is 1), which is second only to that of the root node; and a priority of the current node is 2 (for example, a distance between the current node and the root node is 2), which is second to that of the parent node. Herein, it is not limited that a number such as 0 or 1 is used for identification, and any information that can reflect a priority may be used for identification of the priority. Based on this example, if there are a plurality of synchronization paths in the synchronization area, for a plurality of different nodes that have a same distance from the root node, the plurality of different nodes may have a same priority in different synchronization paths.

Optionally, each node may notify another node of a priority of the node. For example, in an implementation, each node may explicitly indicate a priority of the node to another node. For example, the node may send broadcast information or node information, and the broadcast information or the node information includes the priority of the node. Alternatively, in another implementation, each node may implicitly indicate a priority of the node to another node. In an example, each node sends a synchronization signal in a broadcast manner for time-frequency synchronization between another node and the node. The synchronization signal includes a synchronization sequence, and a priority of each node may be implicitly indicated by using the synchronization sequence. Certainly, in the foregoing description, an example in which there is a correspondence between a synchronization sequence and a node priority and the synchronization sequence implicitly indicates the node priority is used for description, and this is not intended to limit this embodiment of this application. Information that has a correspondence with the node priority may alternatively be other information. For example, the other information may be a root sequence of a synchronization sequence, or the like. In other words, the priority of the node may alternatively be implicitly indicated by using the other information, for example, the root sequence of the synchronization sequence. In the following example description, an example in which the at least one node explicitly indicates the priority of the at least one node to the first node, for example, the node information sent by the at least one node includes the priority of the node is used for description.

For example, a process in which the first node selects the second node from the at least one node is as follows. The first node may obtain the priority of the at least one node in the following manner. In addition to the synchronization information of the synchronization area to which the node belongs, the node information sent by the at least one node may further include the priority of the node. For example, in addition to synchronization information of a synchronization area 2 to which a node 2 belongs, node information sent by a node 2 further includes a priority of the node 2. The first node may obtain a priority of each of the at least one node by using the node information of the at least one node. Alternatively, the first node may obtain a priority of each of the at least one node based on the synchronization sequence of the at least one node. After the first node obtains the priority of each of the at least one node, the first node may select, from the at least one node, a node with a highest priority as the second node.

It may be understood that, in this case, a plurality of nodes may have a same priority and a highest priority. The first node may select one node from the plurality of nodes with the highest priority as the second node according to a first preset rule. The first preset rule may be selecting a node randomly or based on signal strength of a plurality of nodes and/or quantities of nodes included in synchronization areas to which the plurality of nodes belongs, or the like.

For example, the at least one node includes a node A, a node B, and a node C. A priority of the node A is a priority 2, priorities of the node B and the node C are the same and are both a priority 1, and the priority 1 is higher than the priority 2. The first node may select one node from the node B and the node C as the second node according to the first preset rule.

In the foregoing description, the first node selects the second node based on the priority of the at least one node.

In some embodiments, a priority may also be set for the synchronization area. The priority of the synchronization area may also be indicated to the first node by using the node information, or indicated to the first node in a pre-configuration manner. The first node may select the second node based on the priority of the synchronization area to which the at least one node belongs. For example, the first node selects, as the second node, a node that belongs to a synchronization area with a highest priority. The foregoing example is still used. The at least one node includes a node A, a node B, and a node C, a priority of a synchronization area A to which the node A belongs is 1, a priority of a synchronization area B to which the node B belongs is 2, a priority of a synchronization area to which the node C belongs is 3, and the priority 1 is higher than the priority 2 and the priority 3. The first node may select the node A corresponding to the synchronization area A with the highest priority as the second node. In this case, a plurality of synchronization areas may have a highest priority. Similar to the foregoing description, the first node may continue to consider factors such as a quantity of nodes included in a synchronization area and/or signal strength of a node.

2. The First Node Preferentially Considers a Quantity of Nodes Included in a Synchronization Area to which a Node Belongs.

The first node determines, based on the synchronization information included in the node information sent by the at least one node, a quantity of nodes included in a synchronization area to which each of the at least one node belongs; and the first node selects, as the second node, a node in a synchronization area that includes a largest quantity of nodes. The foregoing example is still used. The at least one node includes a node A, a node B, a node C, and the like, a quantity of nodes included in a synchronization area A to which the node A belongs is N1, a quantity of nodes included in a synchronization area B to which the node B belongs is N2, and a quantity of nodes included in a synchronization area C to which the node C belongs is N3. N1, N2, and N3 are all positive integers. If a value of N3 is greater than the values of N1 and N2, the first node may select the node C as the second node.

It may be understood that, in the foregoing case, there may be a case in which synchronization areas to which a plurality of nodes belongs include a largest quantity of nodes. The foregoing example is still used. If values of N1 and N2 are the same and are greater than a value of N3, the first node needs to select one node from the node A and the node B as the second node. The first node may select, as the second node according to a second preset rule, one node from the nodes belonging to the synchronization areas that include the largest quantity of nodes. The second preset rule may be selecting a node randomly, or based on signal strength and/or priorities of a plurality of nodes, or the like.

3. The First Node Preferentially Considers Signal Strength of a Node.

The first node may select a node with highest signal strength of node information, broadcast information, or another channel or signal from the at least one node as the second node. The signal strength of the node information may refer to signal strength at which the first node receives node information from another node, and the signal strength of the broadcast information may refer to signal strength at which the first node receives broadcast information. In an example, the broadcast information may be a synchronization signal. Optionally, received signal strength of the first node=radio frequency transmit power+transmit end antenna gain-path loss-obstacle attenuation+receive end antenna gain. The received signal strength may be measured by decibel (dB) or decibel relative to one milliwatt (dBm). For example, if signal strength, for example, received signal strength, at which the first node receives broadcast information from a node A is 100 dBm, and signal strength, for example, received signal strength, at which the first node receives broadcast information from a node B is 101 dBm, the first node may select the node B as the second node.

It may be understood that, in the foregoing case, a plurality of nodes may have a highest received signal strength. The first node may select one node from the plurality of nodes as the second node according to a third preset rule. The third preset rule may be selecting a node randomly, or based on priorities of a plurality of nodes and/or quantities of nodes included in synchronization areas to which the plurality of nodes belongs, or the like.

In the foregoing embodiment, a synchronization process of the first node is described. This embodiment of this application may be further described from another dimension. A starting point of the dimension is whether the first node joined another synchronization area before establishing time-frequency synchronization with the second node.

1. Before the first node performs time-frequency synchronization with the second node, the first node does not belong to any synchronization area. The quantity of nodes in the second synchronization area to which the second node belongs is greater than or equal to a quantity of nodes in any synchronization area other than the second synchronization area in at least one synchronization area to which the at least one node belongs.

Further, if at least two synchronization areas exist in the at least one synchronization area to which the at least one node belongs, quantities of nodes in the at least two synchronization areas are the same and are greater than a quantity of nodes in any synchronization area other than the at least two synchronization areas in the at least one synchronization area, and a priority and/or signal strength of the second node are/is higher than a priority and/or signal strength of any node other than the second node in nodes corresponding to the at least two synchronization areas.

In some embodiments, the first node is just started and has not joined any synchronization area, for example, the first node does not belong to any synchronization area. In this case, the first node needs to select one node from the at least one node to establish time-frequency synchronization, unless the first node is the first started node in an entire network, or there is no other started node around the first node, and the first node cannot receive node information of any node. The first node may establish a synchronization area, and the synchronization area includes only the first node. In the following embodiments, a process of how the first node selects the second node for establishing time-frequency synchronization from the at least one node when the first node does not belong to any synchronization area is mainly discussed.

In an example, the first node may determine, based on the synchronization information included in the node information sent by the at least one node, quantities of nodes included in synchronization areas to which different nodes belong. The first node may select, as the second node, a node in a synchronization area that includes a largest quantity of nodes.

It may be understood that, in the foregoing case, synchronization areas to which a plurality of nodes belong may include a largest quantity of nodes. In this case, the first node may select, according to the second preset rule, the second node from the plurality of nodes that belong to the synchronization areas including the largest quantity of nodes.

2. Before the first node performs time-frequency synchronization with the second node, the first node belongs to a first synchronization area, and the quantity of nodes in the second synchronization area to which the second node belongs is greater than or equal to a quantity of nodes in the first synchronization area. In an example, the quantity of nodes in the second synchronization area to which the second node belongs is greater than or equal to a quantity of nodes in any synchronization area other than the second synchronization area in at least one synchronization area to which the at least one node belongs.

Further, the quantity of nodes in the second synchronization area to which the second node belongs is equal to a quantity of nodes in the first synchronization area, and a priority and/or signal strength of the second node are/is higher than a priority and/or signal strength of a node with which the first node establishes time-frequency synchronization. Optionally, that a priority and/or signal strength of the second node are/is higher than a priority and/or signal strength of a node with which the first node establishes time-frequency synchronization may be replaced with that a priority and/or signal strength of the second node are/is higher than a priority and/or signal strength of the first node. Both the foregoing two solutions fall within the protection scope of this application. The node with which the first node establishes time-frequency synchronization (or a synchronization source used by the first node to join the first synchronization area) is a node with which the first node performs time-frequency synchronization to join the first synchronization area. For example, the first node is originally time-frequency synchronized with a node A, and belongs to the first synchronization area. The first synchronization area includes N nodes. Subsequently, the second synchronization area to which a node B belongs also includes N nodes, the quantity of nodes included in the first synchronization area is the same as the quantity of nodes included in the second synchronization area, and both are N. In this embodiment of this application, if a priority and/or signal strength of the node B are/is higher than a priority and/or signal strength of the node A, the first node may perform time-frequency synchronization with the node B to join the second synchronization area. Alternatively, if a priority and/or signal strength of the node B are/is higher than the priority and/or the signal strength of the first node, the first node performs time-frequency synchronization with the node B to join the second synchronization area. In the following embodiment, an example in which signal strength and/or priorities of the node B and the node A are compared is used for description.

In some embodiments, the first node has joined the first synchronization area before performing time-frequency synchronization with the second node, for example, the first node belongs to the first synchronization area. The first node may determine, based on the synchronization information included in the node information sent by the at least one node, a quantity of nodes included in a synchronization area to which each of the at least one node belongs. For details, refer to the following. It may be understood that, for ease of understanding, the entire process is described as the following two steps "1" and "2" in order, but this is essentially not intended to limit this application. For example, an order of performing the following two steps "1" and "2" is not limited, and it is not limited that any one of the following steps "1" and "2" needs to be performed.

1. The first node determines, based on the quantity of nodes included in the synchronization area to which the at least one node belongs, that a synchronization area to which one or more nodes in the at least one node belong includes a largest quantity of nodes, for example, N nodes, where N is a positive integer. For example, the at least one node includes a node A, a node B, and a node C. A quantity of nodes included in a synchronization area to which the node A belongs is N1, a quantity of nodes included in a synchronization area to which the node B belongs is N2, and a quantity of nodes included in a synchronization area to which the node C belongs is N3. If a value of N3 is greater than a value of N2, and the value of N2 is greater than a value of N1, in the foregoing three nodes, a node belonging to a synchronization area that includes a largest quantity of nodes is the node C.

2. The quantity of nodes included in the first synchronization area is compared with a largest quantity of nodes in the synchronization area to which the at least one node belongs. For ease of description, in the following embodiment, a node in a synchronization area that includes a largest quantity of nodes in the synchronization area to which the at least one node belongs may be referred to as a target node, and a synchronization area to which the target node belongs is referred to as a target synchronization area. There may be the following three cases.

In a first case, the quantity of nodes included in the first synchronization area is greater than a quantity of nodes included in the target synchronization area, and the first node continues to belong to the first synchronization area. Further, optionally, in the network, the first synchronization area to which the first node belongs includes a largest quantity of nodes. Further, at least one node near the first node may subsequently join the first synchronization area by using the node information of the first node.

In a second case, the quantity of nodes included in the first synchronization area is less than a quantity of nodes included in the target synchronization area, and the first node establishes time-frequency synchronization with the target node corresponding to the target synchronization area, for example, the target node is the second node.

It may be understood that, in this case, there may be a plurality of target nodes. The first node may continue to select, according to the second preset rule, one node from the plurality of target nodes as the second node for establishing time-frequency synchronization.

In a third case, the quantity of nodes included in the first synchronization area is equal to a quantity of nodes included in the target synchronization area. The first node establishes time-frequency synchronization with the target node only when a priority and/or signal strength of the target node are/is higher than a priority and/or signal strength of a node with which the first node establishes time-frequency synchronization; otherwise, the first node continues to belong to the first synchronization area.

In an optional design, the signal strength of the target node may include received signal strength at which the first node receives node information or broadcast information from the target node, and the signal strength of the node with which the first node establishes time-frequency synchronization may include received signal strength at which the first node performs receiving from the node with which the first node needs to keep time-frequency synchronization in the first synchronization area.

It should be noted that, in the foregoing description, regardless of a manner in which the first node selects the second node, the following case may occur. The at least one node includes at least one third node other than the second node, and the at least one third node and the second node belong to the second synchronization area. The first node may determine the second node from the second node and the at least one third node according to a fourth preset rule. For example, the second node is determined from the second node and the at least one third node according to the fourth preset rule. Optionally, the fourth preset rule includes at least one of the following such as a priority, signal strength, and the like. For example, the first node may preferentially select a node with a high priority and/or a node with high signal strength as the second node from the second node and the at least one third node.

According to the foregoing description, the first node may select the second node from the at least one node. A subsequent process in which the first node establishes time-frequency synchronization with the second node may include that the first node receives a synchronization signal from the second node, where the synchronization signal may include time information and frequency information of the second node. The first node may establish time synchronization between the first node and the second node based on the time information of the second node, and establish frequency synchronization between the first node and the second node based on the frequency information of the second node.

Optionally, after step 202, the method may further include the following.

Step 203: The first node may send first updated synchronization information of the second synchronization area, where the first updated synchronization information is updated synchronization information based on establishment of the time-frequency synchronization. Optionally, the first updated synchronization information may be sent in a broadcast or unicast manner. In an example, it may be understood that, the first updated synchronization information is obtained after the first node updates the synchronization information of the second synchronization area based on establishment of the time-frequency synchronization.

In some embodiments, that the first node establishes time-frequency synchronization with the second node represents that the first node joins the second synchronization area. The first node needs to update the synchronization information of the second synchronization area. For example, the synchronization information of the second synchronization area includes a node identifier. The synchronization information of the second synchronization area before the update does not include an identifier of the first node, and the synchronization information of the second synchronization area after the update includes the identifier of the first node. In an example, if the synchronization information of the second synchronization area includes a quantity of nodes, and the quantity of nodes in the synchronization information of the second synchronization area before the update is M, a quantity of nodes in the synchronization information of the second synchronization area after the update is M+1, where M is a positive integer greater than or equal to 1. The first node may notify another node around the first node of the updated synchronization information. The another node may include a node belonging to the second synchronization area, a node belonging to another synchronization area, and the like.

In some embodiments, that a node in a network periodically sends broadcast information is used as an example. After the first node establishes time-frequency synchronization with the second node, in a normal case, the first node may further periodically receive broadcast information from the second node. If the first node determines, within a preset time period, that the broadcast information of the second node is not received, it indicates that the second node is faulty or is moved out of the network. In this case, the first node may update the synchronization information of the second synchronization area. For example, the synchronization information of the second synchronization area is updated from the first updated synchronization information to second updated synchronization information. Then, the first node may send the second updated synchronization information. For example, node information is sent to notify another surrounding node. The node information includes the second updated synchronization information of the second synchronization area, and the second updated synchronization information is obtained by updating the first updated synchronization information based on determining that the node information of the second node is not received.

Figure 3C:
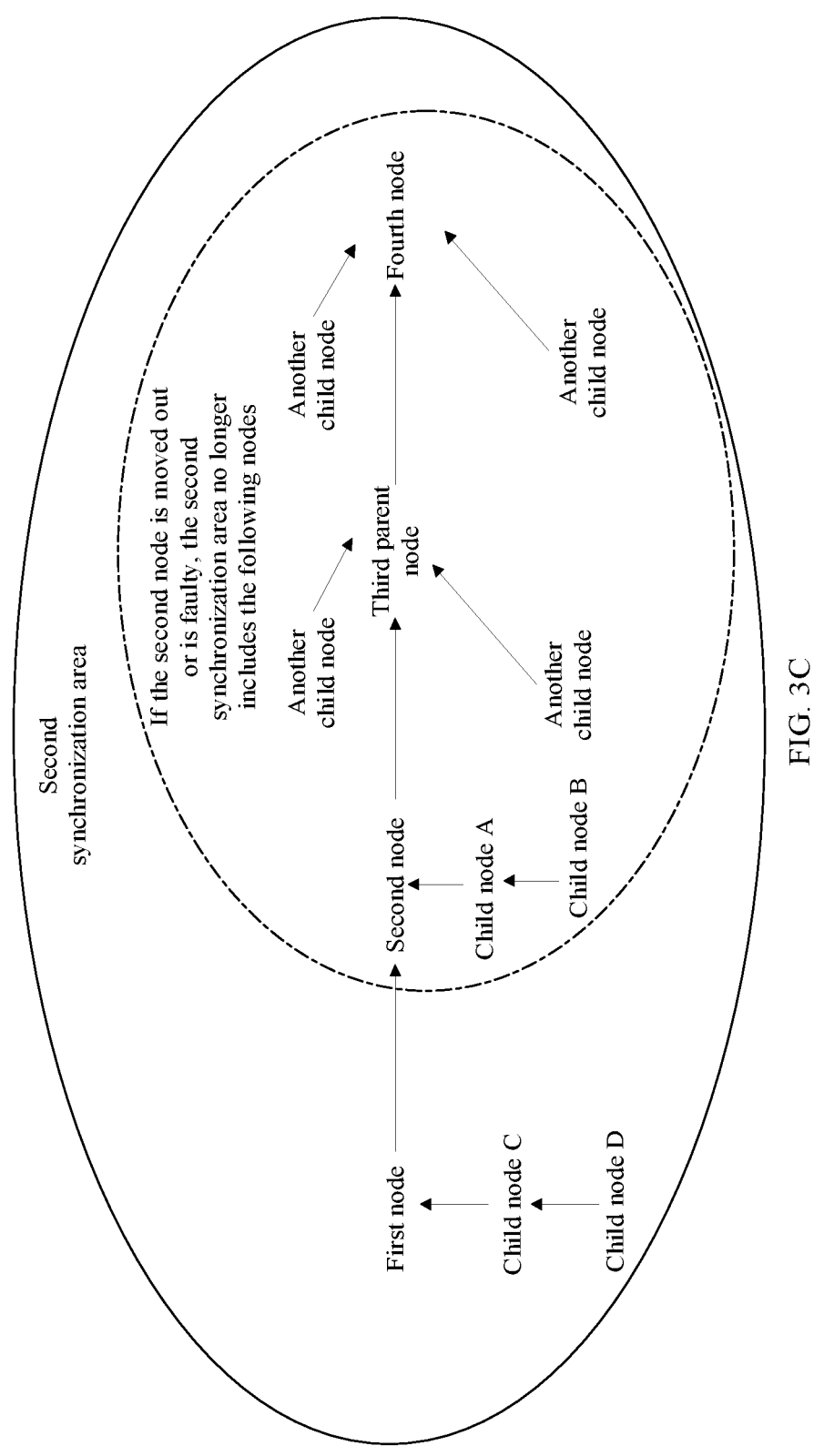
FIG. 3C is a schematic diagram of a synchronization area according to an embodiment of this application.

For example, the synchronization information includes a node identifier. The synchronization information before the update, for example, the first updated synchronization information, may include an identifier of the second node, and the updated synchronization information, for example, the second updated synchronization information, no longer includes the identifier of the second node. Optionally, in addition to not including the identifier of the second node, the second updated synchronization information may no longer include an identifier of a child node of the second node and an identifier of a parent node of the second node. Optionally, the child node of the second node may include a direct child node and an indirect child node of the second node. The direct child node of the second node is a node that joins the second synchronization area by establishing time-frequency synchronization with the second node, and the indirect child node of the second node is a node that joins the second synchronization area by establishing time-frequency synchronization with a child node of the second node. The parent node of the second node may include a direct parent node, an indirect parent node, and the like of the second node. The direct parent node of the second node is a node with which the second node e indirect parent node of the second node is a node with which a parent node of the second node establishes time-frequency synchronization to join the second synchronization area. For example, as shown in FIG. 3C, the first node joins the second synchronization area by establishing time-frequency synchronization with the second node. For all nodes included in the second synchronization area, refer to FIG. 3C. When the first node cannot continue to receive the broadcast information of the second node because the second node is faulty or is moved out of the network, or the like, the first node may update the synchronization information of the second synchronization area. The synchronization information no longer includes identifiers of at least the following nodes such as another child node other than the first node of the second node, and a parent node of the second node. The another child node includes another direct child node and indirect child node other than the first node of the second node. For example, in FIG. 3C, a child node A is a direct child node of the second node, and a child node B is an indirect child node of the second node. The parent node of the second node includes a direct parent node, an indirect parent node, and the like of the second node. For example, as shown in FIG. 3C, a third node is a direct parent node of the second node. Because a direct parent node of the third node is a fourth node, the fourth node is an indirect parent node of the second node. For example, the updated synchronization information of the second synchronization area includes identifiers of only the following nodes such as the first node and a child node of the first node, where the child node of the first node includes a direct child node, an indirect child node, and the like of the first node. For example, as shown in FIG. 3C, a child node C is a direct child node of the first node, and a child node D is an indirect child node of the first node.

In some embodiments, if the solution of this embodiment of this application is described from a dimension of the second node, the solution includes at least the following that the second node sends node information (for example, by using first broadcast information), where the node information includes first synchronization information of a second synchronization area; the second node receives node information from the first node (for example, by using second broadcast information), where the node information includes second synchronization information of the second synchronization area, the second synchronization information corresponds to the foregoing first updated synchronization information, and the second synchronization information is updated synchronization information based on establishment of time-frequency synchronization; and the second node updates the first synchronization information to the second synchronization information. Optionally, the second node may further send the second synchronization information (for example, by using third broadcast information).

In the foregoing description, an example in which the second node updates the synchronization information of the second synchronization area after receiving the second synchronization information from the first node is used for description, but this does not constitute a limitation on this application. In another case, the second node may also update the synchronization information of the second synchronization area. For example, when the first node establishes time-frequency synchronization with the second node, the first node notifies the second node, and after receiving the notification, the second node may directly update the synchronization information of the second synchronization area.

In some embodiments, it may be pre-specified that the first node establishes time-frequency synchronization with only a node with a higher priority or an equal priority. If the priority of the second node is lower than that of the first node, before the first node establishes time-frequency synchronization with the second node, the method may further include that the first node decreases the priority of the first node and/or increases the priority of the second node, so that the priority of the second node is higher than or equal to that of the first node. A process in which the first node increases the priority of the second node may include that the first node sends indication information to the second node, to indicate the second node to increase the priority of the second node. Optionally, the indication information may include the priority of the first node, so that the second node increases the priority of the second node with reference to the priority of the first node. Alternatively, the second node may adjust the priority of the second node according to a trigger condition such as a system requirement and received information about a surrounding node.

Based on the foregoing solution, embodiments of this application provide two specific embodiments. As shown in FIG. 3A, an example in which a network in the two embodiments includes five primary nodes such as G1, G2, G3, G4, and G5, is used to describe how to implement time-frequency synchronization between the five primary nodes. In the following embodiments, an example in which broadcast information carries synchronization information and/or a node priority is used for description.

Embodiment 1

In Embodiment 1, it is not specified that a node can only establish time-frequency synchronization with a node with a higher priority or an equal priority. A time-frequency synchronization process is as follows.

Phase 1:

G5 is first powered on, and if G5 cannot find broadcast information sent by any surrounding node, G5 works independently. A list of nodes in a first synchronization area is {G5}, and a quantity of nodes included in the first synchronization area is 1. Subsequently, G4 is powered on, finds G5, establishes time-frequency synchronization with G5, updates the list of nodes in the first synchronization area to {G4, G5}, and updates the quantity of nodes included in the first synchronization area to 2.

G1 is powered on, and if G1 cannot find broadcast information sent by any surrounding node, G1 works independently. A list of nodes in a second synchronization area includes {G1}, and a quantity of nodes included in the second synchronization area is 1. G2 is powered on, and finds G1. G2 establishes time-frequency synchronization with G1, updates the list of nodes in the second synchronization area to {G2, G1}, and updates the quantity of nodes included in the second synchronization area to 2.

G3 is powered on, and finds broadcast information sent by surrounding G2 and G4, and quantities of nodes included in synchronization areas to which G2 and G4 belong are both 2. In this case, G3 may select, according to a fifth preset rule, a corresponding node from G2 and G4 to establish time-frequency synchronization. The fifth preset rule may be selecting a corresponding node randomly, or based on strength of signals received from G2 and G4 and/or priorities of G2 and G4, or the like. If G3 chooses to establish time-frequency synchronization with G4, G3 updates the list of nodes in the second synchronization area to {G3, G4, G5}, and updates the quantity of nodes included in the second synchronization area to 3.

Phase 2:

A primary node performs time-frequency synchronization search again, and G2 finds broadcast information of G3 and G1. The quantity 3 of nodes included in the second synchronization area to which G3 belongs is greater than the quantity 1 of nodes included in the first synchronization area to which G1 belongs. To keep time-frequency synchronization in an entire network, G2 establishes time-frequency synchronization with G3, updates the list of nodes in the second synchronization area to {G2, G3, G4, G5}, and updates the quantity of nodes included in the second synchronization area to 4.

In some embodiments, when G2 establishes time-frequency synchronization with G3, it indicates that G2 is moved out of the first synchronization area and joins the second synchronization area. Then, after G2 joins the second synchronization area, G2 may send broadcast information including the synchronization information of the second synchronization area. When receiving the broadcast information, G1 may determine, by using the synchronization information carried in the broadcast information, that G2 has moved out of the first synchronization area, and G1 may update the list of nodes included in the first synchronization area to {G1}, and update the quantity of nodes included in the first synchronization area to 1.

Phase 3:

The primary node performs time-frequency synchronization search again, and G1 finds broadcast information of G2. Because the quantity 1 of nodes included in the first synchronization area to which G1 belongs is less than the quantity 4 of nodes included in the second synchronization area to which G2 belongs, G1 establishes time-frequency synchronization with G2, and G1 updates the list of nodes in the second synchronization area to {G1, G2, G3, G4, G5}, and updates the quantity of nodes included in the second synchronization area to 5.

In some embodiments, in a working process, if a primary node is faulty or is moved out of the network, a time-frequency synchronization relationship of the network may need to be adjusted accordingly. For example, in phase 3, if G3 is faulty or is moved out of the network, and G2 determines that G3 is faulty or is moved out of the network, G2 updates the list of nodes in the synchronization area to {G1, G2}, and updates the quantity of nodes in the synchronization area to 2. Strictly, when G2 breaks a time-frequency synchronization relationship with G3, G1 and G2 form a new synchronization area. Because G2 does not join another synchronization area, and is still in the original synchronization area, G2 may update the synchronization information such as the list of nodes and/or the quantity of nodes. For ease of description, this update is also referred to as update of the synchronization information of the second synchronization area herein. An update process is as follows. The entire synchronization area list is updated from {G1, G2, G3, G4, G5} to {G1, G2}, the quantity of nodes is updated from 5 to 2, and so on. From another perspective, G4 serves as a parent node of G3. If G4 determines that G3 is faulty or is moved out of the network, G4 determines that G3 is not in a current synchronization area, and G4 updates a list of nodes in the synchronization area to {G4, G5}, updates a quantity of nodes in the synchronization area to 2, and notifies G5. In this case, for G4, a synchronization area in which G4 is located may also be referred to as a second synchronization area. However, the synchronization area in which G4 is located is essentially different from the synchronization area in which G2 is located. A number or a name of the synchronization area is not limited in this embodiment of this application, provided that the entire solution can be clearly understood.

It can be learned from the foregoing description that time-frequency synchronization is implemented in phase 3, and the list of nodes in the synchronization area includes {G1, G2, G3, G4, G5}. However, because G3 is faulty or is moved out of the network, the entire synchronization area is divided into two synchronization areas such as {G1, G2} and {G4, G5}. It should be noted that, although there are two synchronization areas, the nodes in the two synchronization areas are still time-frequency synchronized in a specific period of time in essence, but the nodes in the two synchronization areas may lose time-frequency synchronization after the specific period of time. In some embodiments, when G3 joins the network again or recovers, G3 may join the synchronization area of {G4, G5} or join the synchronization area of {G1, G2}. After time-frequency synchronization search is performed again, time-frequency synchronization in the entire network can be implemented again. The entire network includes only one synchronization area, for example, {G1, G2, G3, G4, G5}. Alternatively, in some other embodiments, although G3 is faulty or is moved out of the network, if G2 can find broadcast information of G4 or G5, G2 may establish time-frequency synchronization with G4 or G5, the synchronization area is updated to {G1, G2, G4, G5} or $$\left\{ \frac{G1, G2}{G4}, G5 \right\},$$

and the quantity of nodes included in the synchronization area is updated to 4.

It can be learned from the foregoing description that, a parent node with which a primary node performs time-frequency synchronization is continuously updated based on information such as a list of nodes in a synchronization area to which the primary node belongs and a quantity of nodes included in the synchronization area, to achieve time-frequency synchronization in the entire network, reduce interference between different primary nodes, and improve a system communication capability.

Embodiment 2

In Embodiment 2, it is specified that G1 and G5 have the highest priority, and G2, G3, and G4 have the second highest priority, and it is specified that all primary nodes establish time-frequency synchronization with only a node with a higher priority or an equal priority. A time-frequency synchronization process is as follows.

Time-frequency synchronization processes in phase 1 and phase 2 are similar to those in Embodiment 1, and are not described herein. A main difference lies in phase 3 in which G1 establishes time-frequency synchronization with G2. In Embodiment 2, phase 3 is as follows.

G1 has the highest priority, and a preset rule is that a node establishes time-frequency synchronization with only a node with a higher priority or an equal priority. For example, the rule may be pre-specified or preset by a standard or a manufacturer. In this case, G1 may have the following processing solutions.

In a first solution, G1 does not change the priority of G1 or the foregoing preset rule. If there is no node with a higher priority or an equal priority around G1, G1 does not establish time-frequency synchronization with any node. In this case, G1 can only work independently and waits another node with a lower priority to establish time-frequency synchronization with G1. Based on the foregoing processing solution, the entire network includes two synchronization areas such as {G1} and {G2, G3, G4, G5}. Time-frequency synchronization is not implemented in the entire network.

In a second solution, G1 discards or does not consider the foregoing priority rule, and establishes time-frequency synchronization with a node based on a quantity of nodes included in a synchronization area. G1 may establish time-frequency synchronization with G2. This is close to the solution in Embodiment 1, and may implement time-frequency synchronization in the entire network. The entire network includes one synchronization area, and the synchronization area includes {G1, G2, G3, G4, G5}. In this solution, G1 ignores the foregoing predefined rule. From an implementation perspective, special processing may be performed to meet a communication performance requirement, but this does not affect pre-specification or presetting by a standard or a manufacturer.

In a third solution, G1 decreases the priority of G1, and/or increases the priority of G2, so that the priority of G2 is higher than or equal to the priority of G1. In some embodiments, a process in which G1 increases the priority of G2 may include G1 sends indication information to G2, to indicate G2 to increase the priority of G2. Optionally, the indication information may include the priority of G1, so that G2 increases the priority of G2 with reference to the priority of G1. Alternatively, G2 may increase the priority of G2 based on a system requirement and received information from a surrounding node. Optionally, the increased priority of G2 should not be higher than the priority of the parent node G3 of G2. Through the foregoing priority adjustment, G1 can establish time-frequency synchronization with G2 during next network-wide time-frequency synchronization, to implement time-frequency synchronization in the entire network.

It can be learned from the foregoing description that, in a time-frequency synchronization process, a priority of a node may be updated, to implement network-wide time-frequency synchronization and improve a communication capability of a primary node.

The method in embodiments of this application is described above in detail with reference to FIG. 1 to FIG. 3C. The apparatus provided in embodiments of this application is described below in detail with reference to FIG. 4 and FIG. 5. It should be understood that descriptions of apparatus embodiments correspond to descriptions of the method embodiments. Therefore, for content that is not described in detail, mutual reference may be made.

Figure 4:
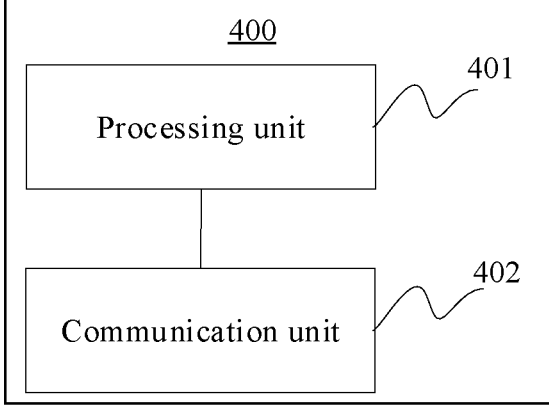
FIG. 4 is a schematic diagram of a structure of an apparatus according to an embodiment of this application.

FIG. 4 is a schematic block diagram of an apparatus 400 according to an embodiment of this application. The apparatus 400 is configured to implement a function of the first node or the second node in the foregoing method embodiments. For example, the apparatus may be a software module or a chip system. The chip system may include a chip, or may include a chip and another discrete device. The apparatus 400 includes a processing unit 401 and a communication unit 402. The communication unit 402 is configured to communicate with another device, and may also be referred to as a communication interface, a transceiver unit, an input/output interface, or the like.

In some embodiments, the apparatus 400 is configured to implement a function of the first node in the foregoing method embodiments, and the apparatus 400 may be the first node, a chip or a circuit configured in the first node, or the like. The processing unit 401 is configured to perform a processing-related operation of the first node in the foregoing method embodiments, and the communication unit 402 is configured to perform a sending/receiving-related operation of the first node in the foregoing method embodiments.

The communication unit 402 is configured to receive at least one piece of node information from at least one node. The processing unit 401 is configured to control the first node to establish time-frequency synchronization with a second node that is in the at least one node and that belongs to a second synchronization area, where node information from the second node includes synchronization information of the second synchronization area, and the synchronization information indicates at least one of a node identifier, a quantity of nodes, a synchronization status, or a synchronization direction between nodes in the second synchronization area. Optionally, the at least one piece of node information is sent by the at least one node in a broadcast manner.

Optionally, the communication unit 402 is further configured to send first updated synchronization information of the second synchronization area, where the first updated synchronization information is obtained by updating the synchronization information of the second synchronization area based on establishment of the time-frequency synchronization. Optionally, the first updated synchronization information is sent in a broadcast manner.

Optionally, the processing unit 401 is further configured to determine, from the at least one node based on the node information of the at least one node and/or signal strength of the at least one node, the second node that belongs to the second synchronization area.

Optionally, the quantity of nodes in the second synchronization area is greater than or equal to a quantity of nodes in any synchronization area other than the second synchronization area in at least one synchronization area to which the at least one node belongs.

Optionally, before the first node is controlled to establish time-frequency synchronization with the second node that is in the at least one node and that belongs to the second synchronization area, the first node belongs to a first synchronization area; and the quantity of nodes in the second synchronization area is greater than or equal to a quantity of nodes in the first synchronization area.

Optionally, before the first node is controlled to establish time-frequency synchronization with the second node that is in the at least one node and that belongs to the second synchronization area, the first node belongs to a first synchronization area; and the quantity of nodes in the second synchronization area is equal to a quantity of nodes in the first synchronization area, and a priority and/or signal strength of the second node are/is higher than a priority and/or signal strength of a node with which the first node establishes time-frequency synchronization.

Optionally, before the first node is controlled to establish time-frequency synchronization with the second node that is in the at least one node and that belongs to the second synchronization area, the first node does not belong to any synchronization area.

Optionally, at least two synchronization areas exist in the at least one synchronization area to which the at least one node belongs, quantities of nodes in the at least two synchronization areas are the same and are greater than a quantity of nodes in any synchronization area other than the at least two synchronization areas in the at least one synchronization area, the second node belongs to the at least two synchronization areas, and a priority and/or signal strength of the second node are/is higher than a priority and/or signal strength of any other node than the second node in nodes corresponding to the at least two synchronization areas.

Optionally, the at least one node includes at least one third node other than the second node, and the at least one third node belongs to the second synchronization area; and the second node is determined from the second node and the at least one third node according to a preset rule.

Optionally, the preset rule includes at least one of the following such as a priority of a node or signal strength of a node.

Optionally, before the first node is controlled to establish time-frequency synchronization with the second node that is in the at least one node and that belongs to the second synchronization area, a priority of the first node is higher than that of the second node; and the processing unit 401 is further configured to decrease the priority of the first node and/or increase the priority of the second node, so that the priority of the second node is higher than or equal to that of the first node.

Optionally, the processing unit 401 is further configured to determine, within a preset time period, that broadcast information of the second node is not received; and the communication unit 402 is further configured to send node information, where the node information includes second updated synchronization information of the second synchronization area, and the second updated synchronization information is obtained by updating the first updated synchronization information based on the determining that broadcast information of the second node is not received. The second updated synchronization information may be sent in a broadcast manner.

Optionally, the node identifier is a MAC address of a node, an identifier that is generated based on a MAC address of a node and that identifies a node identity, another identifier for identifying a node identity, or an identifier of a communication domain in which the node is located.

In some other embodiments, the apparatus 400 is configured to implement a function of the second node in the foregoing method embodiments. The apparatus 400 may be the second node, a chip or a circuit configured in the second node, or the like. The processing unit 401 is configured to perform a processing-related operation of the second node in the foregoing method embodiments, and the communication unit 402 is configured to perform a sending/receiving-related operation of the second node in the foregoing method embodiments.

For example, the communication unit 402 is configured to send node information of the second node, where the node information includes first synchronization information of a second synchronization area to which the second node belongs; and receive node information from a first node, where the node information includes second synchronization information of the second synchronization area, the second synchronization information is updated synchronization information based on establishment of time-frequency synchronization, and the second synchronization information is different from the first synchronization information. Further, optionally, the processing unit 401 is configured to update the first synchronization information to the second synchronization information, where the synchronization information indicates at least one of a node identifier, a quantity of nodes, a synchronization status, or a synchronization direction between nodes in the second synchronization area. For example, the node information of the second node is included in first broadcast information, and/or the node information of the first node is included in second broadcast information.

Further, the communication unit 402 is further configured to send the second synchronization information of the second synchronization area and/or priority information of the second node. For example, the second synchronization information and/or the priority information of the second node are/is included in third broadcast information.

Optionally, the node information of the first node includes priority information of the first node, and/or the node information of the second node includes the priority information of the second node.

In an example, the node identifier is a MAC address of a node, an identifier that is generated based on a MAC address of a node and that identifies a node identity, another identifier for identifying a node identity, or an identifier of a communication domain in which the node is located.

In this embodiment of this application, division into the units is an example, and is merely logical function division. During actual implementation, another division manner may be used. In addition, function units in embodiments of this application may be integrated into one processor, or each unit may exist alone physically, or two or more units may be integrated into one unit. The integrated unit may be implemented in a form of hardware, or may be implemented in a form of a software function unit.

Figure 5:
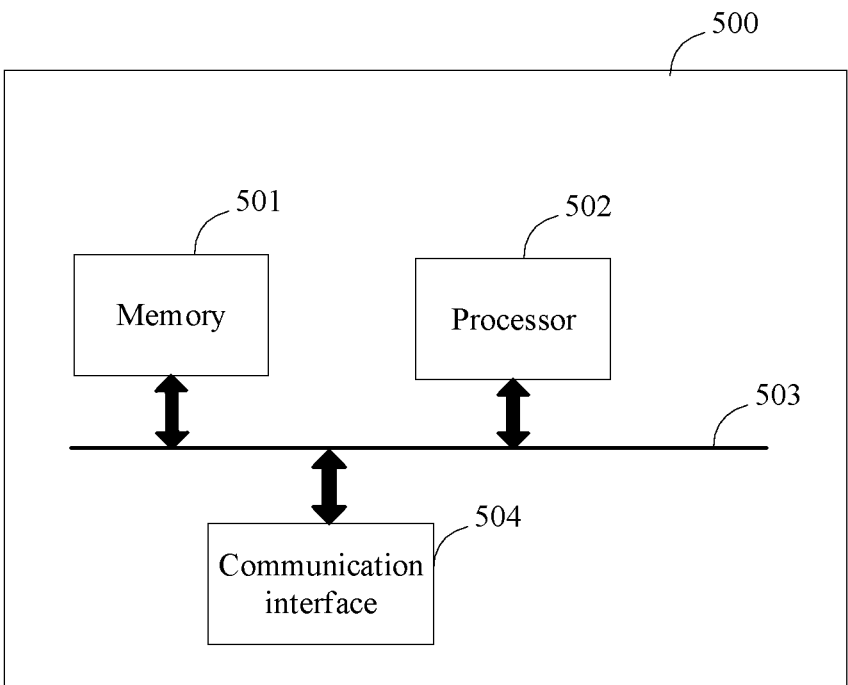
FIG. 5 is a schematic diagram of another structure of an apparatus according to an embodiment of this application.

FIG. 5 is a schematic diagram of an apparatus 500 according to an embodiment of this application. The apparatus 500 may be a node or a component in a node, for example, a chip or an integrated circuit. The apparatus 500 may include at least one processor 502 and a communication interface 504. Further, optionally, the apparatus may further include at least one memory 501. Further, optionally, a bus

503 may be further included. The memory 501, the processor 502, and the communication interface 504 are connected by using the bus 503.

The memory 501 is configured to provide storage space, and the storage space may store data such as an operating system and a computer program. The memory 501 may be one or a combination of a random-access memory (RAM), a read-only memory (ROM), an erasable programmable ROM (EPROM), a compact disc ROM (CD-ROM), or the like.

The processor 502 is a module that performs an arithmetic operation and/or a logic operation, and may be one or a combination of processing modules such as a central processing unit (CPU), a graphics processing unit (GPU), a microprocessor unit (MPU), an application-specific integrated circuit (ASIC), a field-programmable gate array (FPGA), a complex programmable logic device (CPLD), a coprocessor (which assists the CPU in completing corresponding processing and application), a microcontroller unit (MCU), and the like.

The communication interface 504 may be configured to provide an information input or output for the at least one processor; and/or the communication interface may be configured to receive data sent from the outside and/or send data to the outside, and may be a wired link interface including an Ethernet cable or the like, or may be a wireless link (Wi-Fi, Bluetooth, universal wireless transmission, an in-vehicle short-range communication technology, or the like) interface. Optionally, the communication interface 504 may further include a transmitter (for example, a radio frequency transmitter or an antenna), a receiver, or the like coupled to the interface.

In some embodiments, the apparatus 500 may be the first node in the foregoing method embodiments or a component in the first node, for example, a chip or an integrated circuit. The processor 502 in the apparatus 500 is configured to read the computer program stored in the memory 501, to control the first node to perform the following operations such as receiving at least one piece of node information from at least one node; and controlling the first node to establish time-frequency synchronization with a second node that is in the at least one node and that belongs to a second synchronization area, where node information from the second node includes synchronization information of the second synchronization area, and the synchronization information indicates at least one of a node identifier, a quantity of nodes, a synchronization status, or a synchronization direction between nodes in the second synchronization area. For specific details, refer to the description in the foregoing method embodiments. Details are not described again.

In some other embodiments, the apparatus 500 may be the second node in the foregoing method embodiments or a component in the second node, for example, a chip or an integrated circuit. The processor 502 in the apparatus 500 is configured to read the computer program stored in the memory 501, to control the second node to perform the following operations such as sending node information of the second node, where the node information includes first synchronization information of a second synchronization area; and receiving node information from a first node, where the node information includes second synchronization information of the second synchronization area, the second synchronization information is updated synchronization information based on establishment of time-frequency synchronization, and the second synchronization information is different from the first synchronization information. Further, optionally, the second node is further controlled to update the first synchronization information to the second synchronization information. The synchronization information indicates at least one of a node identifier, a quantity of nodes, a synchronization status, or a synchronization direction between nodes in the second synchronization area. For specific details, refer to the description in the foregoing method embodiments. Details are not described again.

An embodiment of this application further provides a terminal. The terminal may be a smart cockpit device, a smart household device, a smart manufacturing device, a vehicle, or the like. It may also be understood that the foregoing "automotive wireless short-range communication system" technology may be applied to a short-range communication system in the non-automotive field. The terminal includes a first node and/or a second node. The first node and the second node may be respectively the first node and the second node in the embodiment shown in FIG. 2. A type of the first node may be the same as or different from a type of the second node. For example, in some embodiments, if the first node and the second node are of different types, the first node may be one or more of modules such as a camera, a screen, a microphone, a speaker, a radar, an electronic key, a keyless entry and startup system controller, and user equipment UE. The second node may be a base station, a cockpit domain controller (CDC), or the like. Alternatively, in some embodiments, if the type of the first node is the same as the type of the second node, the first node and the second node each may be a base station, a CDC, or the like. Alternatively, the first node and the second node each may be one or more of modules such as a camera, a screen, a microphone, a speaker, a radar, an electronic key, a keyless entry and startup system controller, and user equipment UE. Optionally, the terminal may be an uncrewed aerial vehicle, a robot, a device in a smart household scenario, a device in a smart manufacturing scenario, or the like.

Further, an embodiment of this application further provides an apparatus, including units configured to implement the embodiment shown in FIG. 2. Alternatively, the apparatus includes a processor and an interface circuit. The processor is configured to communicate with another apparatus by using the interface circuit, and perform the method in the foregoing method embodiments. Alternatively, the apparatus includes a processor, configured to invoke a program stored in a memory, to perform the method described in the embodiment shown in FIG. 2.

An embodiment of this application further provides a computer-readable storage medium, including instructions. When the instructions are run on a computer, the computer is enabled to perform the method described in the embodiment shown in FIG. 2.

An embodiment of this application further provides a chip system. The chip system includes at least one processor and an interface circuit. Further, optionally, the chip system may further include a memory or an external memory. The processor is configured to exchange instructions and/or data by using the interface circuit, to implement the method in the foregoing method embodiments. The chip system may include a chip, or may include a chip and another discrete component.

An embodiment of this application further provides a computer program product, including instructions. When the computer program product runs on a computer, the computer is enabled to perform the method described in the embodiment shown in FIG. 2.

In embodiments of this application, the processor may be a general-purpose processor, a digital signal processor, an application-specific integrated circuit, a field programmable gate array or another programmable logic device, a discrete gate or transistor logic device, a discrete hardware component, a coprocessor, or the like, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

In embodiments of this application, the memory may be a non-volatile memory, such as a hard disk drive (HDD) or a solid-state drive (SSD), or may be a volatile memory, such as a RAM. The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

All or some of the methods provided in embodiments of this application may be implemented by software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

It is clear that a person skilled in the art may make various modifications and variations to this application without departing from the scope of this application. Thus, this application is intended to cover these modifications and variations, provided that they fall within the scope of the claims of this application and their equivalent technologies.

What is claimed is:

1. A communication method, comprising:

receiving node information from at least one node; and controlling, using the node information, a first node to establish time-frequency synchronization with a second node that is in the at least one node, wherein the second node belongs to a second synchronization area, wherein the node information comprises synchronization information of the second synchronization area, and wherein the synchronization information indicates at least one of a node identifier, a quantity of nodes, a synchronization status, or a synchronization direction between nodes of the at least one node in the second synchronization area.

2. The communication method of claim 1, further comprising sending first updated synchronization information of the second synchronization area, wherein the first updated synchronization information is based on updating the synchronization information after establishment of the time-frequency synchronization.

3. The communication method of claim 1, further comprising determining, from the at least one node based on at least one of the node information or a signal strength of a signal from the at least one node, the second node that belongs to the second synchronization area.

4. The communication method of claim 1, wherein the second synchronization area comprises a first quantity of nodes that is greater than or equal to a second quantity of nodes in any other synchronization area in at least one synchronization area to which the at least one node belongs.

5. The communication method of claim 1, wherein the first node belongs to a first synchronization area before control of the first node, and wherein a second quantity of nodes in the second synchronization area is greater than or equal to a first quantity of nodes in the first synchronization area.

6. The communication method of claim 1, wherein the first node belongs to a first synchronization area before control of the first node, wherein a second quantity of nodes in the second synchronization area is equal to a first quantity of nodes in the first synchronization area, and wherein at least one of a second priority or a second signal strength of the second node is higher than at least one of a respective first priority or a respective first signal strength of a node with which the first node establishes the time-frequency synchronization.

7. The communication method of claim 1, wherein the first node does not belong to any synchronization area before control of the first node.

8. The communication method of claim 7, wherein at least two synchronization areas exist in the at least one synchronization area to which the at least one node belongs, wherein each of the at least two synchronization areas has a first quantity of nodes, wherein the first quantity of nodes is greater than a second quantity of nodes in any synchronization area other than the at least two synchronization areas, wherein the second node belongs to the at least two synchronization areas, and wherein at least one of a second priority or a second signal strength of the second node is higher than at least one of a respective first priority or a respective first signal strength of any node other than the second node in nodes corresponding to the at least two synchronization areas.

9. The communication method of claim 1, wherein the at least one node comprises a third node, wherein the third node belongs to the second synchronization area, and wherein the second node is based on a combination of the second node and the third node according to a preset rule.

10. The communication method of claim 9, wherein the preset rule comprises at least one of a priority of a node from the at least one node or a signal strength of the node from the at least one node.

11. The communication method of claim 1, wherein a first priority of the first node is higher than a second priority of the second node before control of the first node, and wherein the communication method further comprises at least one of decreasing a first priority of the first node to be lower than or equal to a second priority of the second node or increasing the second priority of the second node, to be higher than or equal to the first priority of the first node.

12. The method of claim 2, further comprising:
determining, within a preset time period, that broadcast information of the second node is not received; and
sending the node information, wherein the node information comprises second updated synchronization information of the second synchronization area, and wherein the second updated synchronization information is based on the first updated synchronization information and after determining that the broadcast information of the second node is not received.

13. The method of claim 1, wherein the node identifier is a media access control (MAC) address, an identifier that is based on the MAC address and that identifies a node identity, another identifier for identifying a node identity, or an identifier of a communication domain in which a node in the at least one node is located.

14. A communication method, comprising:
sending second node information of a second node, wherein the second node information comprises first synchronization information of a second synchronization area to which the second node belongs; and
receiving first node information from a first node based on the node information,
wherein the first node information comprises second synchronization information of the second synchronization area,
wherein the second synchronization information is updated synchronization information based on establishment of time-frequency synchronization, and
wherein the first synchronization information indicates at least one of a node identifier, a quantity of nodes, a synchronization status, or a synchronization direction between nodes in the second synchronization area.

15. The communication method of claim 14, further comprising: sending at least one of the second synchronization information or second priority information of the second node.

16. The communication method of claim 15, wherein the first node information comprises at least one of first priority information of the first node, or the second node information comprises the second priority information.

17. The communication method of claim 14, wherein the node identifier is a media access control (MAC) address, an identifier that is based on the MAC address and that identifies a node identity, another identifier for identifying a node identity, or an identifier of a communication domain in which a node is located.

18. A computer program product comprising computer-executable instructions that are stored on a non-transitory computer-readable storage medium and that, when executed by at least one processor, cause a first node to:
receive node information from at least one node; and
control, using the node information, the first node to establish time-frequency synchronization with a second node that is in the at least one node,
wherein the second node belongs to a second synchronization area,
wherein the node information comprises synchronization information of the second synchronization area, and
wherein the synchronization information indicates at least one of a node identifier, a quantity of nodes, a synchronization status, or a synchronization direction between a second quantity of nodes of the at least one node in the second synchronization area.

19. The computer program product of claim 18, wherein the computer-executable instructions further cause the first node to send first updated synchronization information of the second synchronization area, wherein the first updated synchronization information is based on updating the synchronization information after establishment of the time-frequency synchronization.

20. The computer program product of claim 18, wherein the computer-executable instructions further cause the first node to determine, from the at least one node based on at least one of the node information or signal strength of a signal from the at least one node, the second node that belongs to the second synchronization area.

\* \* \* \* \*